INVENTORS.
MATTHEW LUCKIESH
FRANK K. MOSS
BY Kwis, Hudson & Kent
ATTORNEYS.

Sept. 5, 1939.　　　M. LUCKIESH ET AL　　　2,171,881
APPARATUS FOR MEASURING VISUAL EFFICIENCY
Filed Oct. 15, 1936　　　8 Sheets-Sheet 3

INVENTORS.
MATTHEW LUCKIESH
FRANK K. MOSS
BY Kwis, Hudson & Kent
ATTORNEYS.

Sept. 5, 1939.  M. LUCKIESH ET AL  2,171,881
APPARATUS FOR MEASURING VISUAL EFFICIENCY
Filed Oct. 15, 1936  8 Sheets-Sheet 4
FIG. 6
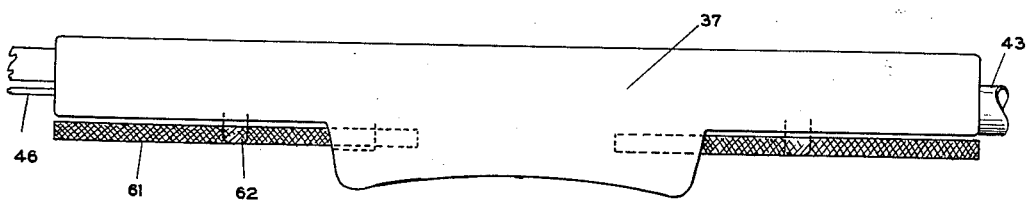
FIG. 7
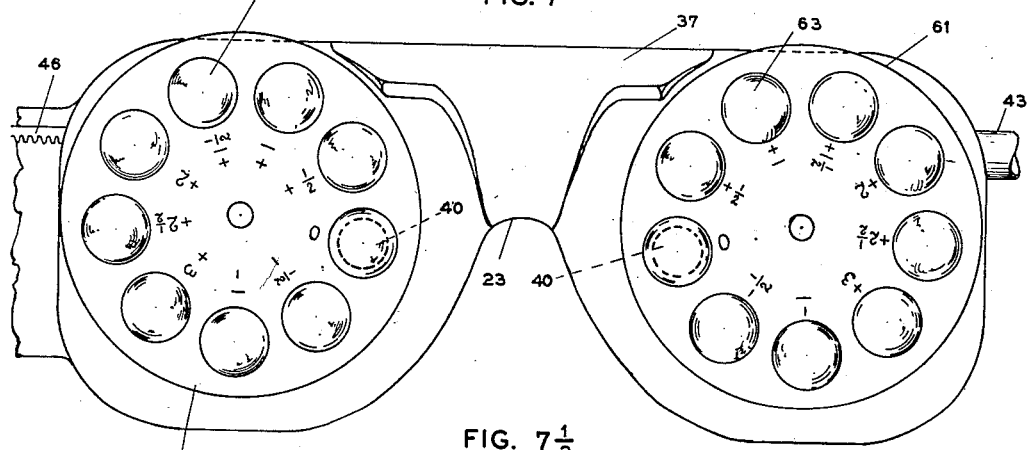
FIG. 7½
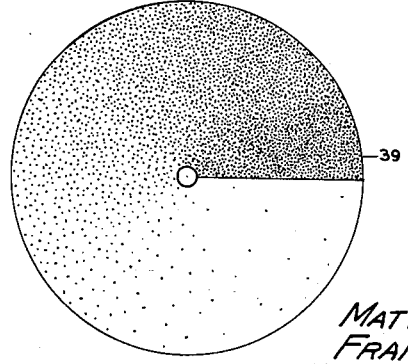
INVENTORS.
MATTHEW LUCKIESH
FRANK K. MOSS
BY Kwis, Hudson & Kent
ATTORNEYS.

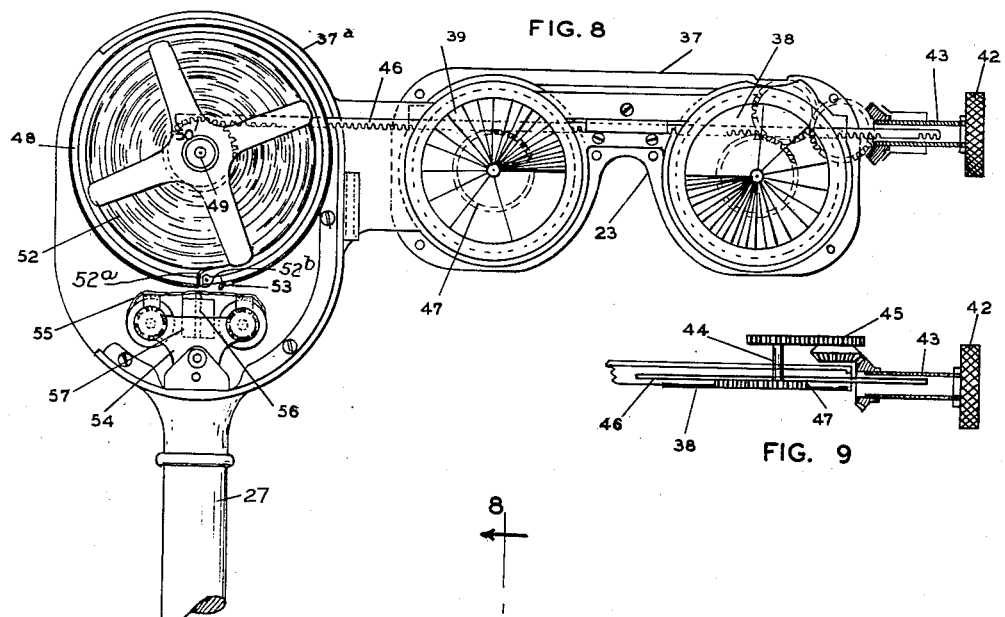
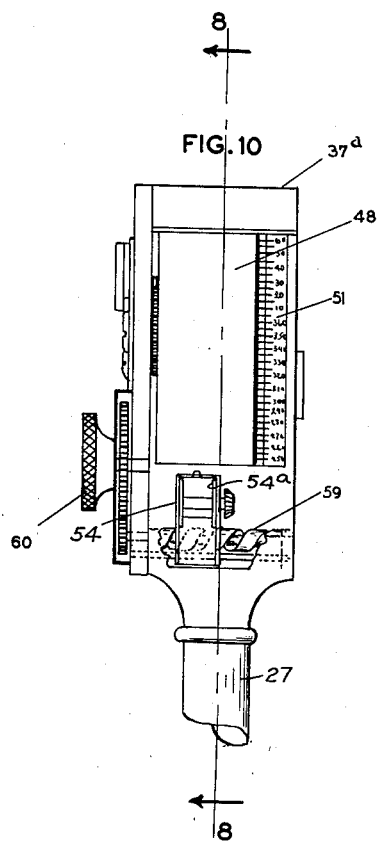

Sept. 5, 1939.   M. LUCKIESH ET AL   2,171,881
APPARATUS FOR MEASURING VISUAL EFFICIENCY
Filed Oct. 15, 1936   8 Sheets-Sheet 6

INVENTORS.
MATTHEW LUCKIESH
FRANK K. MOSS
BY *Kwis, Hudson & Kent*
ATTORNEYS.

Sept. 5, 1939.   M. LUCKIESH ET AL   2,171,881
APPARATUS FOR MEASURING VISUAL EFFICIENCY
Filed Oct. 15, 1936   8 Sheets-Sheet 8

INVENTORS.
MATTHEW LUCKIESH
FRANK K. MOSS
BY Fuis, Hudson & Kent
ATTORNEYS.

Patented Sept. 5, 1939

2,171,881

UNITED STATES PATENT OFFICE 2,171,881

APPARATUS FOR MEASURING VISUAL EFFICIENCY

Matthew Luckiesh, Shaker Heights, and Frank K. Moss, Cleveland, Ohio

Application October 15, 1936, Serial No. 105,734

2 Claims. (Cl. 88—20)

This invention relates to apparatus for subjectively measuring visual efficiency.

The principal object is to provide apparatus which greatly increases precision in refraction and knowledge in optometric and ophthalmic practice, and which extends professional, scientific, and clinical opportunities beyond the present inadequate practice into all realms of seeing including vision, eye-glasses, light, lighting, and visual tasks. In general, the object is to provide means for introducing certain new research techniques into clinical practice in order to obtain subjective measurements of visual function with a degree of precision comparable or superior to that obtained by some objective methods, such as retinoscopy.

In brief, by the new technique involved in the equipment, one readily diagnoses the ability to see and appraises and prescribes lenses, light, and other aids to seeing.

A more specific object is to provide apparatus which yields rational quantitative recordable measurements of visual function for diagnosing and analyzing all important factors of visibility and seeing and for prescribing the controllable factors which increase visibility and aid seeing.

Still further the invention aims to provide apparatus (aptly termed an ophthalmic sensitometer) which increases the precision of obtainable subjective data and introduces new fundamental criteria for the appraisal of visual function, visual tasks, light, lighting, and other factors which affect the ability to see, the sensitometer being so devised that any object or visual task may be utilized as a test-object and the effect of any factor, such as size, brightness, brightness-contrast, color-contrast, configuration, light, and lighting can be measured on a rational scale of visibility and in a manner such that the visibility of any object or visual task under any conditions can be compared with the visibility of any other object or visual task under the same or different conditions.

Further objects are to provide apparatus whereby precise measurements of visual function are made possible by a technique which permits a series of measurements to be made under identical controllable physical conditions thus securing the advantage of an average of several measurements rather than depending upon a single visual measurement for appraising visual conditions.

The above and numerous other objects which will appear from the following description are attained by the present invention which, fundamentally, involves the measurement of visibility under threshold conditions by altering simultaneously two variables or parameters of visibility, to wit, brightness-contrast and brightness. The varying of contrast is highly important in our technique. Preferably the factors of both brightness-contrast and brightness are varied by our invention by using gradient filters, the visibility measurements being both readable and recordable through the medium of a rational quantitative scale which is preferably calibrated in terms of threshold size and in an absolute sense. Thus the visibility of the test-object is varied by the interposed filter rather than by changing the test-object itself. Hence the apparatus may be conveniently manipulated by the patient, under the direction of a non-professional operator, if desired. Additionally, we may provide a second scale which is coordinated with the first and is calibrated in footcandles recommended for ease in seeing any particular visual task.

Other features of novelty reside in convenient means for making visibility measurements for both near and far vision, in the means for obtaining either monocular or binocular measurements, in the means for examining vision in any meridian of the eye, in the means for obtaining a series of measurements of minimum variation among themselves due to the unique configuration of the test-object itself, and also in the means for prescribing quantity of light as an aid to seeing upon a basis consistent with the needs of the patient.

The above and other features of novelty constitute the present invention which may be further briefly summarized as consisting in certain novel features of construction and arrangement of the apparatus or so-called ophthalmic sensitometer.

In the accompanying sheets of drawings wherein we have shown an embodiment of the invention which in practice has proved to be very effective, Fig. 1 is a perspective view looking toward the front of and showing the major portion of the ophthalmic sensitometer;

Figs. 6 and 7 are top and front views respectively showing the principal portions of the visibility meter;

Figure 1:
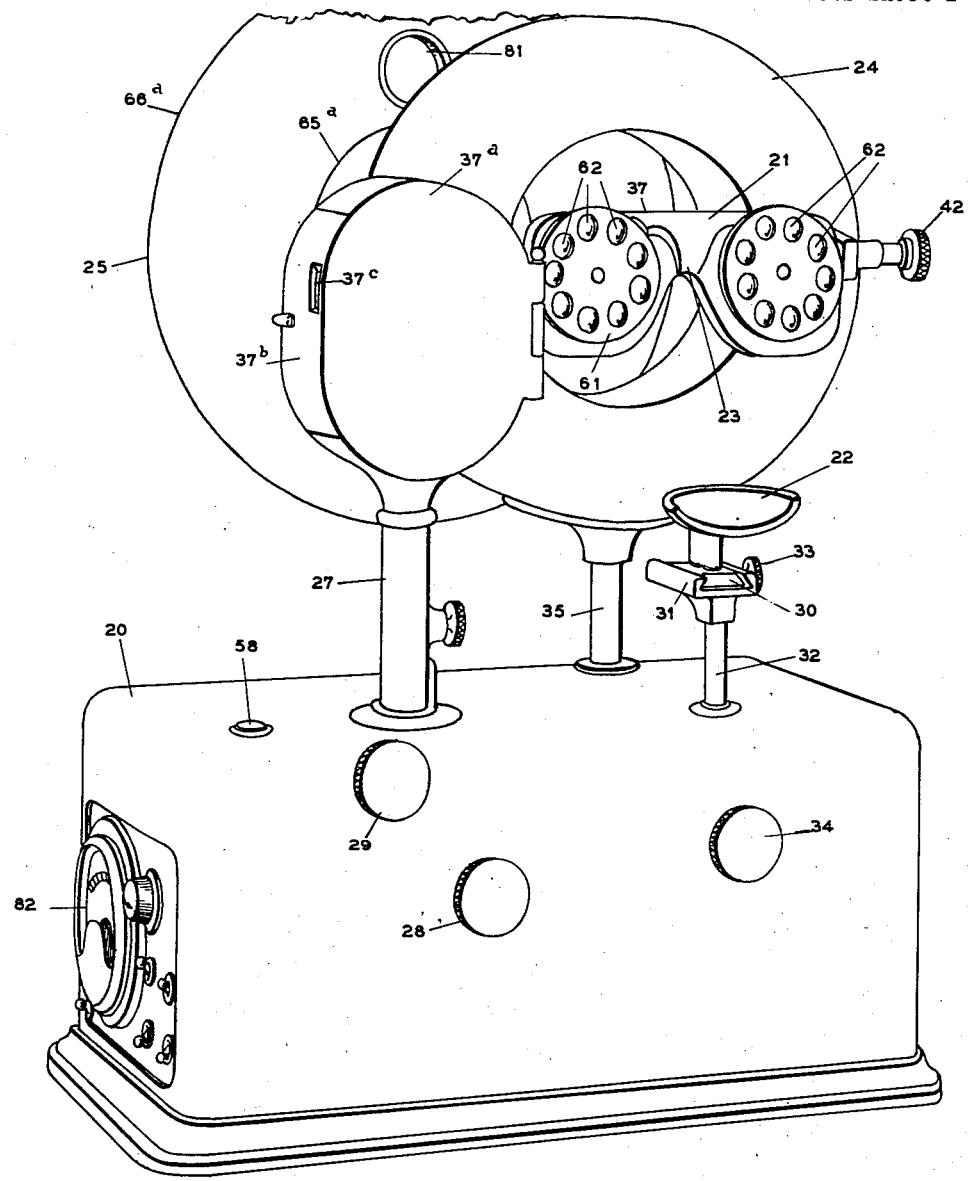

Fig. 7½ is a face view of one of the gradient filters forming a part of the apparatus;

Fig. 8 is a vertical sectional view through the visibility meter showing the gradients and the recording mechanism for recording visibility measurements, together with the means for simultaneously and uniformly rotating the two gradients and the drum of the recording mechanism, the section being taken substantially along the line 8—8 of Fig. 10;

Fig. 9 is a detail sectional view of part of the rotating mechanism for the gradients and drum;

Fig. 10 is a side view looking toward the right of Fig. 7, showing particularly the recording part of the visibility meter with portions broken away and with the cover plate or door removed; and Figs. 11, 12, 13, 14, and 15 are graphs illustrating various ways in which the visibility measurements may be plotted for determining visibility efficency and the correction of ocular defects.

As a prelude to the detailed description of the equipment it might be stated that the ophthalmic sensitometer herein illustrated consists essentially of (1) a photometric device hereinafter referred to as a visibility meter for producing threshold conditions of visibility through alterations in contrast and brightness, (2) a series of sperical lenses combined with the visibility meter, (3) near- and distance-vision units with test object of unique design similar in shape, but varying of course in size, with provision for rotating them, (4) a device for recording measurements of threshold visibility, and (5) a lighting unit for producing and measuring various intensities of illumination on the test-object.

The details of construction and arrangement may be modified very materially, and it is to be understood that the embodiment herein shown is simply illustrative of one of numerous forms that the equipment as a whole may assume.

In this instance, the sensitometer includes a substantially rectangular cabinet 20 which when in use may be supported on a suitable table or other convenient support. In use, the patient sits in front of the cabinet 20 with the visibility meter, designated as a whole by the reference character 21, before his eyes, and with his chin resting upon an adjustable chin rest 22, and he will look through the gradients of the visibility meter as he would look through the lenses of a pair of eye-glasses with the recessed part 23 resting upon the bridge of the nose. Hence the distance of fixation is held constant in both near-vision and distance-vision tests. Just beyond the visibility meter is a lighting unit 24 and beyond the lighting unit is the near-vision unit which is adapted to be illuminated to the desired degree by the lighting unit and has a test-object in the line of vision of the patient, the lighting unit being in the form of an annulus with a large central opening so that it will not obstruct the patient's view when visibility measurements are being made on the near-vision unit or in the distance-vision unit 26 which can be seen by the patient when the near vision unit is folded down out of the way.

The visibility meter as a whole, including the gradients, the adjusting mechanism therefor, and the recording mechanism, is supported by means of a standard 27 projecting upwardly through the top of the cabinet 20. It can be adjusted as to height by turning a suitable handle or knob 28 at the front of the cabinet. An ordinary rack and pinion adjustment for these and other parts may be utilized, in which case the knob 28 will be on a shaft carrying the pinion adapted to engage a rack on the standard 27 beneath the top of the cabinet. Provision will of course be made for firmly supporting the unit by suitably guiding the standard 27 in the cabinet, and, if desired, the latter can be locked in any position of adjustment, as by means of a suitable locking device operated at the front of the cabinet by a knob or handle 29.

Similarly, the chin rest 22 is adjustable both horizontally and vertically. In this instance it is mounted on a horizontally adjustable slide 30 movable in a guideway 31 at the top of a vertically adjustable standard 32. The slide 30 can be locked in the guideway by a locking screw 33 and the chin rest with its standard 32 can be adjusted vertically by any suitable means, such as the common rack and pinion adjustment which can be operated by a handwheel 34 at the front of the cabinet.

Figure 2:
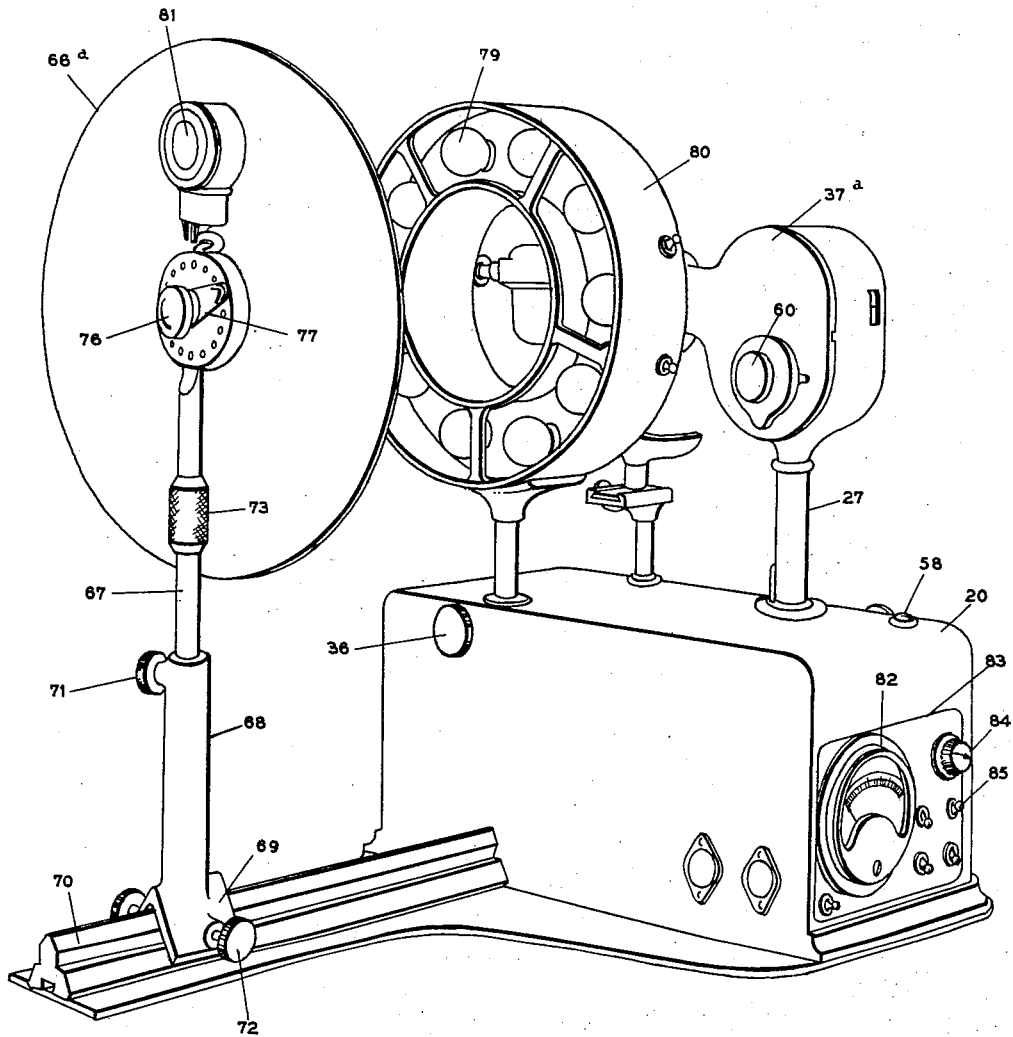
Fig. 2 is a view similar to Fig. 1 but looking toward the rear of the sensitometer.

The lighting unit 24 is mounted on a standard 35 which extends up through the top of the cabinet near the rear side thereof, as indicated in Figs. 1 and 2, and this standard can be adjusted as to height by turning a suitable knob or handle 36, in this instance arranged at the rear side of the cabinet as shown in Fig. 2.

Taking up next the details of the visibility meter, it will be seen by reference to Figs. 6 to 10 inclusive that it comprises a housing or casing 37 which, as previously pointed out, is recessed at 23 so that it may engage the bridge of the patient's nose. On opposite sides of the portion 23 the casing is enlarged and receives a pair of gradients or gradient filters 38 and 39, preferably colorless photographic films, the absorption and diffusion characteristics of which gradually and uniformly increase from a relatively clear portion to a very dense and diffusing portion.

The two gradients, with their precise gradients of density and diffusion not only reduce the apparent brightness of the visual field due to their absorption characteristic but also lower the contrast between the test-object and its background as the density of the gradients increases, the latter effect being caused by the diffusing characteristics of the gradients.

These gradients are adapted to be moved simultaneously past pupillary apertures 40 in the front wall of the casing 37 and past apertures (not shown) in the rear wall of the casing so that the patient or observer may look through these apertures and through the gradients when the visibility measurements are being made. The openings in the rear wall of the casing are preferably controlled by shutters 40a (see Fig. 3) which can be in any convenient form so that visibility measurements may be made monocularly or binocularly, as desired.

The gradients may be mounted and moved in different ways, such as linearly, but preferably they are in the form of rotary disks adapted to be simultaneously rotated past the pupillary apertures 40 by turning a handwheel 42 which is mounted on the end of a shaft 43 journaled in the end of the meter housing 37. Movement may be transmitted by any suitable means from the shaft 43 to the gradients so as to rotate them simultaneously and equally. In this instance the gradients are mounted on horizontal pins 44, and one of these pins is connected by suitable gearing 45, shown in Fig. 9, to the shaft 43. A horizontal rack 46 which is guided in the housing of the meter engages two similar gears 47 on the pins 44 which support the gradients so that when movement is transmitted by the shaft 43 to one of the gradients the other is, by means of the rack, simultaneously and equally rotated. It will of course be understood that the gears 47 do not obstruct the pupillary apertures 40 through which the observer looks as he views the test-object through the gradients. The facilities thus provided, which enable the observer or patient to manipulate the apparatus in obtaining absolute threshold conditions. are regarded as a distinct advantage of this method.

The housing 37 of the visibility meter has an extension 37a which contains the mechanism for recording the visibilty measurements. This recording mechanism includes a drum 48 to which access may be had by a removable door 37b which is indicated in Fig. 1. This drum is mounted on a pin 49 journaled in the rear wall of the housing extension 37a of the meter, and it is provided with a gear 50 which is engaged by an extension of the rack 46, the gear 50 being the same size as the gears 47 on the gradient pins and having the same number of teeth so that as the handwheel 42 is turned the two gradients and the drum will be rotated not only simultaneously but through equal angular distances. On the periphery of the drum near one edge thereof there is provided a scale 51 from which visibilty measurements of a quantitative rational type may be read or taken. This scale may be viewed through a slot 37c in the removable door 37b of that part of the housing which encases the drum, see Fig. 1. As already stated, the visibility measurements may be expressed in terms of any one of the four fundamental variables of the visual threshold. Preferably the scale is calibrated in terms of threshold size. The gradients are so designed that equal spatial changes in the control mechanism result in equal logarithmic changes in the stimulus. Accordingly, the mechanical operation of the instrument throughout the entire range of the gradients, that is to say, equal changes in the position of the gradients in any regions thereof, will produce equal changes in visibility, as indicated on the scale 51, assuming that the patient is viewing the test-object through any portions of the gradients above the subliminal. This characteristic is an essential one if maximum precision is to be obtained. The visual size of the object is expressed in terms of the visual angle in minutes, and the instrument is calibrated by using a series of similar test-objects varying in size from one minute to a predetermined or preselected maximum. Hence, if any object is viewed through the instrument and is barely visible, its visibility may be read from the rationally calibrated scale in terms of size. For example, a certain object may be of threshold visibility with the scale reading 3. This indicates that the object is as visible as a standarized test-object, such as a black parallel bar object upon a white background under predetermined illumination, the critical detail of which subtends a visual angle of 3 minutes. The operator can read the appropriate scale after each setting by the patient and record the measurement on the data sheet. This sale represents a unique characteristic of our invention.

The gradient filters as used in connection with the ophthalmic sensitometer, are for the purpose of diagnosing and prescribing lenses, light, and other aids to seeing. In addition, we have used them as auxiliary attachments to instruments for orthoptic training and treatment, such as the common stereoscope, amblyoscope, rotoscope, stereo-orthopter, and others.

However, in order to facilitate the accumulation of repeated measurements of visibility in clinical practice, the sensitometer includes a mechanism for recording the individual measurements upon a paper tape 52a. The tape 52a is fed from a roll 52 within the cylindrical drum 48 and extends out through a slot 52b in the periphery of the drum and is wound about the outer surface of the drum at the side of the scale, the free end of the tape being preferably held by a suitable clip 53 (see Fig. 8) close to the slot through which the tape emerges from the interior of the drum so that the tape envelops substantially the entire periphery. The patient will adjust the position of the gradients until the visual threshold is reached (preferably from the subliminal), after which the position of the gradients and therefore of the drum is recorded on the tape by making a mark thereon the position of which, by reference to the adjoining scale 51, is the measurement of the visibility and threshold size in terms of size. One important advantage of thus recording the data is that the average value for a series of measurements may be obtained by inspection.

While the recording of the data may be accomplished in different ways, we prefer to accomplish this by providing at the bottom of the drum housing a frame 54 carrying a pair of spaced rolls 54a which accommodate an inked ribbon 55. Beneath the tape centrally of the rolls is a printing member preferably in the form of a plunger or small pin 56 constituting the armature or core of a solenoid coil 57 which is carried by the frame 54. The coil of the solenoid is adapted to be connected to a suitable source of current and is energized by closing a switch consisting in this case of a push-button 58 which, as shown in Figs. 1 and 2, is at the top of the cabinet 20.

It is frequently desirable, when a series of visibility measurements is being taken, as, for example, with the test-object arranged in various meridians, or when the test-object is viewed in a single meridian through lenses of different dioptric powers, that the impression member be moved laterally with respect to the tape, and, accordingly, we make provision for this in the recording apparatus by arranging for lateral movement of the unit including the frame 54, the inked ribbon, and the solenoid. This is accomplished in this case by providing across the lower part of the drum housing a spirally threaded or grooved shaft 59, the frame 54 being partly supported by this grooved shaft and having a suitable follower which engages in the spiral groove. The shaft 59 may be turned by a handwheel 60 arranged in this instance upon the rear side of the drum housing and geared to the shaft. Obviously, by turning the handwheel 60 the recording unit can be moved laterally in each direction, and, if moved after each reading, the different visibility measurements may be readily distinguished and allocated. When a series of measurements has been made, a section of the tape can be torn off and a corresponding section pulled out from the roll and again wound about the periphery of the drum and fastened in place.

In refraction work, it is customary for the refractionist to test a patient's eyes by inserting one after another in a frame before the patient's eyes lenses of different dioptric powers and characteristics. While this method of handling the lenses may be utilized, we prefer to mount spherical lenses, for reasons which will be stated, preselected as to their powers, in disks 61 (see particularly Figs. 1, 6 and 7), the disks being mounted on pins 62 at the front of the meter in a manner such that the lenses, here designated 63, are spaced circumferentially on the disks at such a distance from the axes of the disks and from the axes of the gradients which are immediately behind the disks that as the disks are adjusted the lenses on the two disks will be brought successively before the two pupillary apertures 40 through which the patient looks at the test-object when visibility measurements are being made. The disks 61 will be readily removable from the meter so that they may be replaced with other disks having other series of lenses of the desired powers.

The fixation test-object forming one of the elements of the sensitometer and which is used in conjunction with the visibility meter consists preferably of a black double-concave bar on a uniformly illuminated white field. We find, as a result of a series of extensive experiments, that a test-object of this configuration is best adapted to make visibility measurements under threshold conditions since at the threshold point the bar is of uniform visibility at all points along its length, and it has other advantages to be referred to later. Likewise, we find that excellent results are obtained by a double-concave bar 60 minutes in length or approximately equal to the diameter of the average fovea and 1.5 and 3.75 minutes in width at its center and extremities respectively, although a similarly shaped test-object of different proportions, especially one narrower in width, may in specific cases be more sensitive in revealing small refractive errors.

Test objects of this kind similar in design but varying in size are used on both the near- and the distance-vision units. They are preferably produced as black and white photographic prints so as to avoid inherent variables, such as specular reflection from inks, intaglio effects from pressure, and ragged outlines which frequently characterize test-objects printed from zinc etchings.

Figure 4:
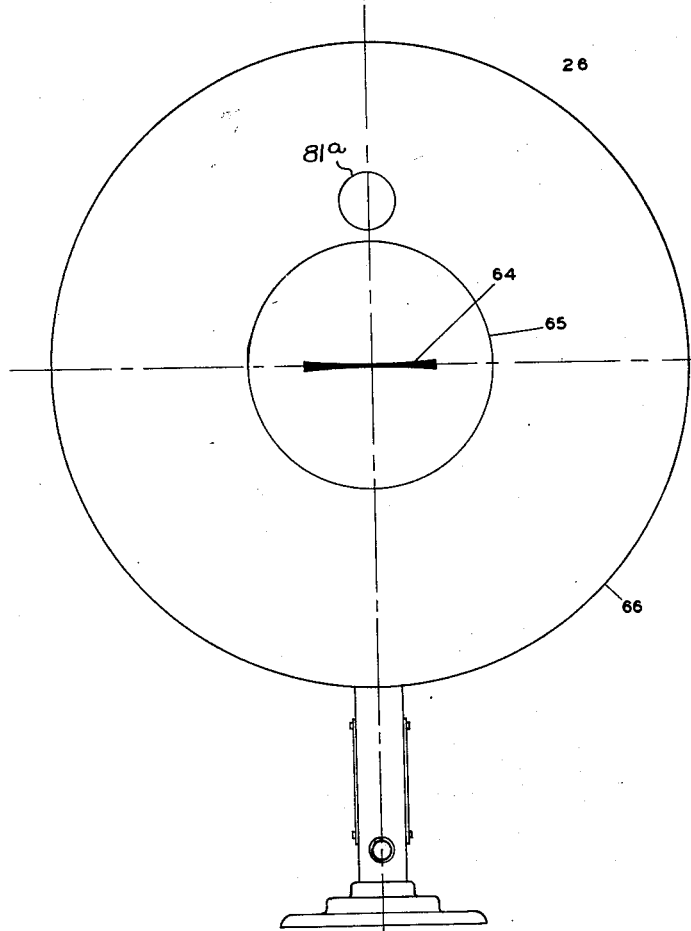
Fig. 4 is a front view of the distance-vision unit including our preferred form of test object, the rotatable disk on which it is mounted, and the relatively large disk beyond it constituting the background or field.
Figure 5:
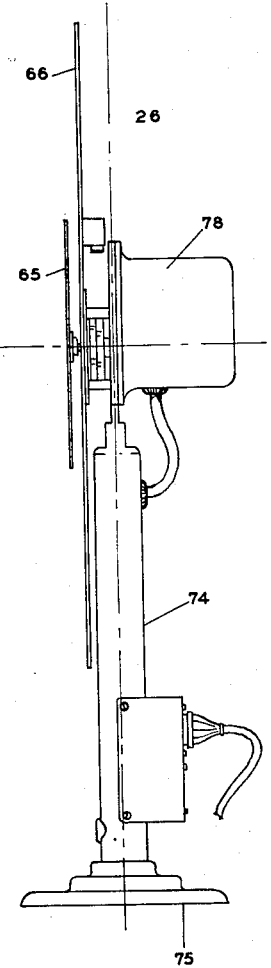
Fig. 5 is a side view of the same.
Figure 3:
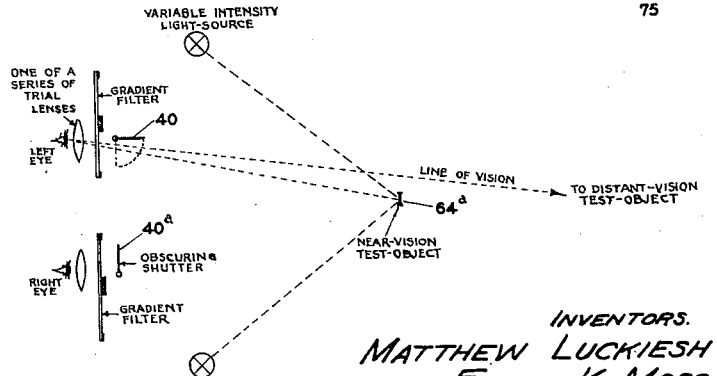
Fig. 3 is a view showing diametrically some of the parts of the sensitometer and the manner in which monocular and binocular visibility measurements are made with reference to the near-vision and the distance-vision test-objects.

In Fig. 4 we have shown at 64 our preferred double-concave bar test-object on the distance-vision unit 26, but it is to be remembered, as stated before, that a similar test object but varying in size will be used on the near-vision unit 25 (see the diagrammatic view of Fig. 3 where the test-object of the near-vision unit is designated 64a). In each instance, i. e., with the near-vision unit or with the distance-vision unit, the test-object is on a white rotatable disk at the center of a large relatively fixed white disk constituting the field or background of the test-object. In Figs. 4 and 5 which show the distance-vision unit, the rotatable disk is designated 65 and the large relatively fixed disk is designated 66. In Figs. 1 and 2, which show the near-vision unit, the large relatively fixed disk is designated 66a and a portion of the relatively small rotatable or adjustable disk is designated 65a. The test-objects and the disks of the near- and distance-vision units are of course in planes at right angles to the line of vision of the patient when observing either test-object through the visibility meter. While, of course, the distance of the near-vision and the distance-vision units may be varied as desired, we find that very good results are obtained when the near-vision unit is approximately 14 inches from the visibility meter and the distance-vision unit is approximately 20 feet therefrom.

The near-vision unit is, as previously stated, just behind the lighting unit 24, as will be seen by reference to Figs. 1 and 2. The disk 66a of this unit is mounted on a rod 67 adjustable vertically in the socket of a standard 68 which at its lower end has a saddle 69 engaging guideways of a support 70 extending horizontally from the rear of the cabinet 20. The rod 67 can be held in any position of adjustment in the standard 68 by a clamping screw 71 and the saddle can be secured in any desired position on the support 70, i. e., at any selected distance from the meter, by clamping screws 72. The rod 67 has a hinged joint and the hinge sections are normally held in alignment by a sleeve 73, but when it is desired to use the distance-vision unit, the sleeve 73 will be slipped up or down along the rod so as to expose the joint, whereupon the disk may be folded back to substantially horizontal position so as not to obstruct the view of the test object 64 of the distance-vision unit.

The disk 66 of the distance-vision unit is mounted upon a standard 74 which can be adjustable if desired, the standard here shown having a base 75 designed to rest upon the floor any suitable distance away from the meter.

The disk 65a carrying the test-object of the near-vision unit is mounted upon a pin which is journaled at the center of the larger disk 66a and provided at its rear end with a handwheel 76 so that it may be rotated, thus permitting the appraisal of refractive errors of the eye in various meridians. Experience with the sensitometer in the appraisal of visual functions by meridians indicates that measurements taken at intervals of 22½° are adequate in most cases. Therefore, the rotatable test-object disk 65a is provided with "click stops" indicated at 77 in Fig. 2 in order to facilitate the setting of the object in the desired meridian. If measurements are desired to be taken at intermediate meridians, this can be readily done by releasing the spring tension of the stop device.

The disk 65 of the distance-vision unit 26 is similarly rotatably mounted at the center of the relatively fixed disk 66 and although this disk 65 may also be turned by hand if desired, it is preferably rotated by an electric motor 78 (see Fig. 5) which may be controlled from a remote point, i. e., by a switch at or on the cabinet. A special motor control is employed which will cause the motor to be automatically stopped after rotating the disk 65 through a predetermined angle, such as 22½°, and which will permit any desired number of such increments of movement to be imparted to the disk.

The lighting of the near-vision test-object is so designed that the major changes in the intensity of illumination upon the object are made by switching on various numbers of lamps 79 (see Fig. 2) which are placed symmetrically in a suitable reflector 80 which, as previously stated, is in the form of an annulus so as not to obstruct the vision of the patient when using the visibility meter, and arranged so as to direct the light effectively on the black test-object and the white field surrounding it. Relatively small changes in illumination may be accomplished by altering the voltage upon the lamps by means of a rheostat.

Preferably the sensitometer is equipped with a photronic cell and a micro-ammeter for measuring the intensity of illumination upon the test-object of the near-vision unit. In this instance the photronic cell is shown at 81 in Figs. 1 and 2, the cell being positioned so as to be sensitive to the light thrown upon the near-vision unit by the lighting unit, and the microammeter, which measures the current generated in the cell and which preferably indicates the extent of illumination in terms of footcandles, is here shown at 82 in Figs. 1 and 2 mounted in the end of the cabinet. The photronic cell is preferably arranged just behind the disk 66a as shown in Fig. 2, the disk having an opening 81a (Fig. 4) through which light may pass to the cell. Since the intensity of illumination upon the test-object is at all times both observable and controllable, changes in the general lighting of the room are readily detected and corrected. Furthermore, such changes in the lighting do not affect the contrast of the test-object with its background, as they do in cases where the the test-object is projected upon a screen, and hence are of minimum importance in the sensitometric method. This fact serves as an excellent example of a fundamental difference between the sensitometric method and the method of projecting test-objects upon a screen.

The micro-ammeter may be carried by a panel 83 which also carries a rheostat knob 84 for varying the voltage impressed upon the lights of the lighting unit and a series of switches 85 which may be utilized in the operation of the sensitometer, as, for example, for opening and closing the circuit of the measurement recorder, for controlling the motor 78 of the distance-vision unit, for controlling the lights of the lighting unit 24, and for controlling the photronic cell 81.

If it is desired to measure the effect of glare on the eyes of a patient, the disk 66a of the near-vision test unit may be provided with a lamp which can be switched on and off as desired. We have in some instances simply replaced the photronic cell with a lamp to determine the effects of glare on the vision of the patient, but this is not essential as both the photronic cell and the glare lamp may be permanently mounted on the disk 66a each being in that case separately controllable.

The lighting equipment for the distance-vision test-object is not here shown but will be arranged to produce either a fixed intensity of given footcandles, such as 10 footcandles, or a variable intensity, through a convenient remote control.

In the use of the sensitometer, the patient sits in front of the cabinet with his chin resting on the chin rest 22, the latter and the visibility meter being adjusted to the proper height, and the various visibility measurements are made for diagnosing and analyzing all the important factors of visibility and for prescribing lenses and, in fact, controllable factors which increase visibility and aid seeing. In each instance the visibility measurements are made by the patient turning the knob or handle 42 while looking at or toward the test-object, which is the previously described double-concave bar when refraction work is being done, and when the threshold is reached either from the supraliminal or from the subliminal, preferably from the latter to avoid the effects of accommodative effort, the visibility measurement is read from the scale 51 which gives a rational, quantitative measurement, and generally a record of the measurement is made on the tape 52. A number of similar measurements are made for each visual situation, and these values are averaged and the results plotted as shown, for example, in Figs. 11, 12, 13, and 14, respectively. It is not necessary for the patient to be dark-adapted before taking these measurements.

Figure 11:
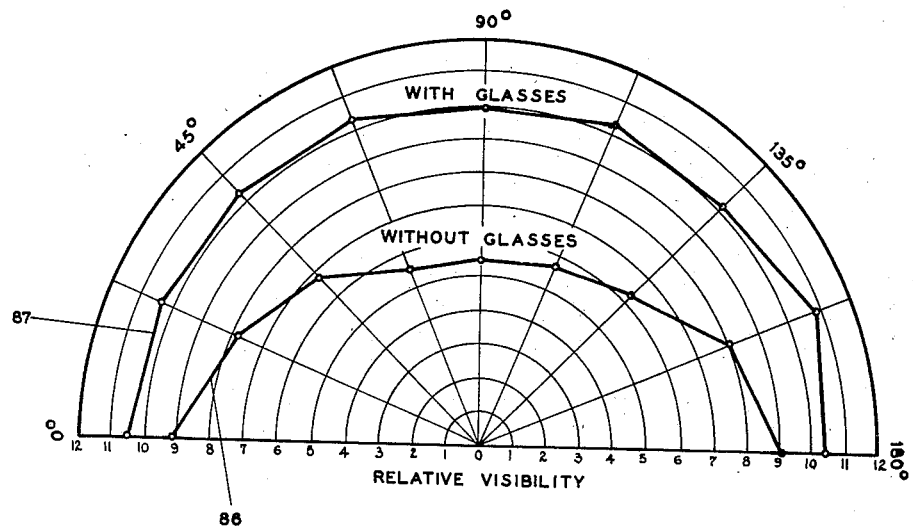
Figure 12:
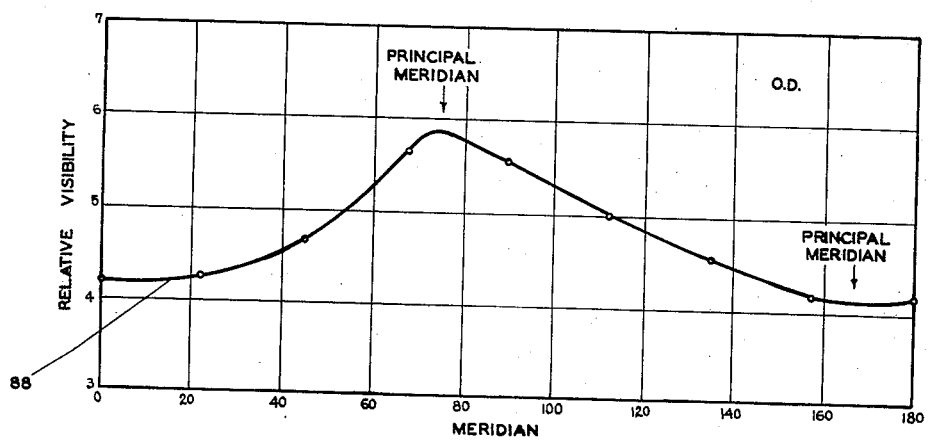
Figure 13:
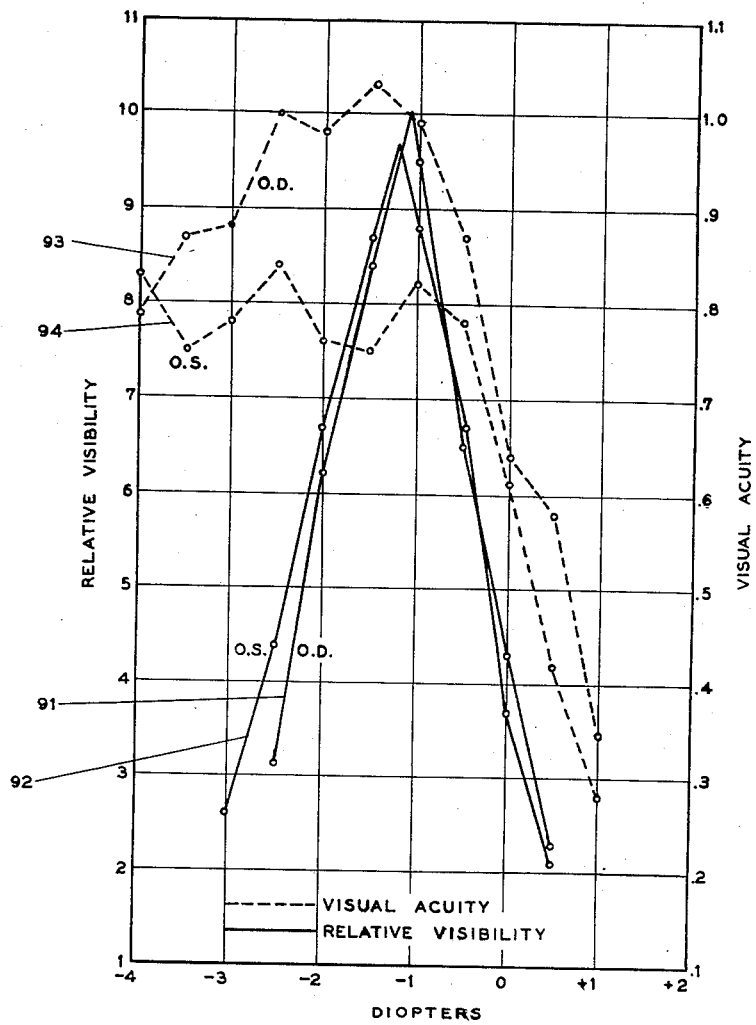
Figure 14:
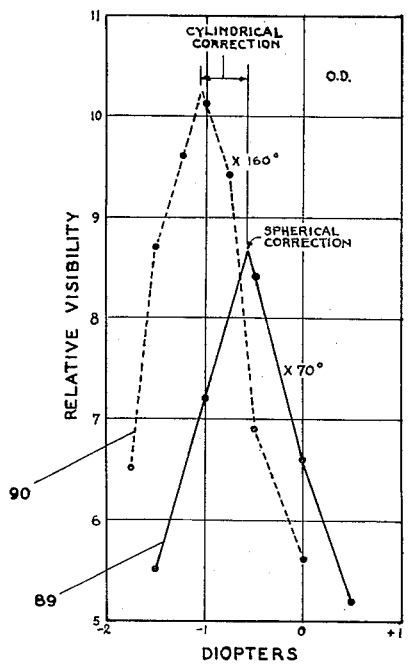
Figure 15:
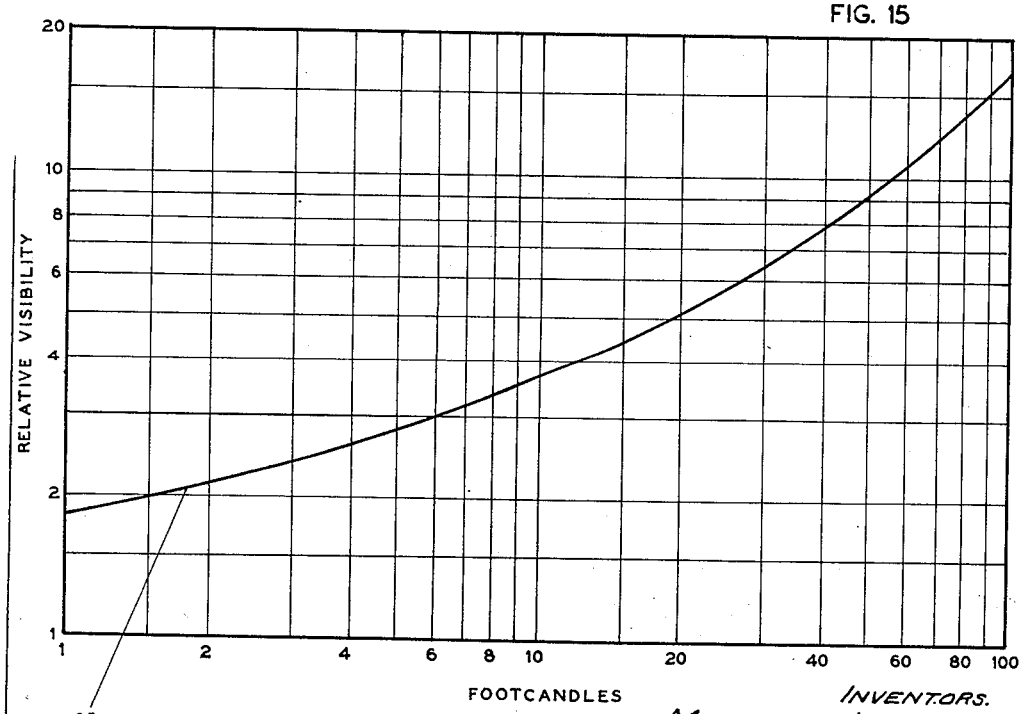

The sensitometric method of refraction involves the following basic steps:

The principal meridians are determined from the relationship between visibility and the angular position of the single-concave bar test-object. The results plotted in Fig. 12 are typical. Obviously the principal meridians are indicated by the points of maximum and minimum visibility, respectively. We have found that these data, when plotted upon polar coordinates, as in Fig. 11, are very useful in explaining to the patient the nature of his eye defects and the correction which has been made. For example, curves 86 and 87, respectively, indicate visual conditions before and after eye-glasses are worn. In complicated cases, such curves are of great technical assistance to the refractionist, especially when they are presented for both near- and distance-vision.

With the test-object in the meridian of best vision, a series of measurements is made for various powers of spherical lenses. This procedure is repeated with the test-object in the meridian of least vision. The data thus obtained are plotted on linear coordinates as in curves 89 and 90, in Fig. 14. In accordance with the theory of the stenopaeic-slit method of refraction, the spherical component of the ophthalmic prescription is indicated by the dioptric power corresponding to maximal vision in the meridian of best vision, curve 89; and the cylindrical component by the algebraic difference in dioptric powers producing maximum vision in the meridian of best vision (curve 89) and in the meridian of least vision (curve 90). Thus it will be obvious that each measurement made contributes in a quantitative manner towards determining the final correction.

It is obvious that this method of obtaining spherical and cylindrical corrections for refractive errors is applicable to the correction of very small as well as very large errors, and that the precision of the diagnostic data obtained may readily be increased, when necessary, by increasing the number of measurements involved. Furthermore, this method is particularly well adapted to the refraction of cases involving small pupils, cloudy media, opacities, and other conditions which make retinoscopy exceedingly difficult and uncertain.

It is emphasized that this method of refraction not only involves repeated, rational, quantitative measurements of visibility based upon a brightness-difference threshold, but also involves a new and novel use of the stenopaeic-slit method. In this respect, the narrow concave bar test-object is analogous in function to the regular stenopaeic slit.

The prescription thus obtained is checked binocularly by altering the spherical corrections before each eye in small steps of dioptric power. The final prescription, upon a basis of maximum vision, involves the dioptric powers which produce the highest degree of binocular vision. Usually, the prescription is not greatly altered as a result of the binocular test, and in those cases where changes are indicated, the change is usually in the direction of less minus power.

For physiologic reasons, however, the dioptric powers corresponding to maximal visibility are not invariably prescribed. When alterations are indicated, the method and technique herein disclosed permit the refractionist to make such alterations in full knowledge of the loss in visibility resulting from "over" or "under" correcting the indicated refractive errors. For example, an average loss of visibility of approximately 25% was obtained with a group of patients by either an over or under correction of ½ diopter. With some patients, the inverted V-shaped curves are very steep and over or under corrections result in extreme losses in visibility. The method and technique enable the refractionist to weigh the physiologic advantages of under or over correcting against the loss in visibility—the latter datum being a precise, rational and quantitative one.

Although the refractive errors may be accurately corrected with lenses, it is not unusual to find that vision is still subnormal. In such cases, it may be to the great advantage of the patient to have the refractionist prescribe the quantity of light which he should have for performing critical visual work. The light prescribing equipment of the sensitometer (Fig. 2) is ideal for this purpose. The technique for prescribing light upon a rational basis consists of measuring visibility of the standard concave bar test-object (or reading matter and other tasks, if preferred) under several levels of illumination in order to determine whether or not a significant improvement in visibility may be obtained from higher levels of illumination. Almost invariably considerable improvement in visibility is obtained if the levels of illumination are high enough. In the absence of quantitative measurements of the relative improvement in seeing as a result of better lighting, the refractionist is in no position to make rational recommendations as to quantity of light.

The significance of sensitometric measurements in refraction is greatly enhanced by reason of the fact that accommodation is held constant due to certain unique characteristics of the new method and technique. A brief explanation of this phase of our technique follows.

If the dioptric requirements for maximum visual efficiency are determined by the usual visual acuity technique, it is obvious that the factors of size and contrast of the object as a whole are always far above their respective thresholds. As the threshold of visual acuity is approached, the critical details of the test-object gradually become unrecognizable although the test-object, as a whole, may be readily seen. Hence sufficient stimulation may be received to induce accommodative effort. However, if a brightness-difference or contrast threshold is approached from a subliminal condition by gradually increasing the contrast between the test-object and its background, the innervation or stimulation which might induce accommodative effort is invariably a minimum if not entirely absent. The data shown in Fig. 13 confirm this fact. It will be noted from curves 93 and 94 obtained by the criterion of visual acuity that the eyes continue to accommodate as minus lenses of increasing power are placed before the eyes after the point of maximum visibility is reached. These results are typical of those obtained when the measurements involve visual acuity as a criterion. Curves 91 and 92 obtained by the hereindescribed method are typical of those obtained when the measurements involve brightness-difference or contrast as a criterion of visual efficiency. It will be noted that curves 91 and 92 rise to sharp and definite maxima. Furthermore, the symmetry of the curves relating dioptric power and visual function, about the axis of maximum visual efficiency, definitely indicates that accommodation is not a variable in this situation. This characteristic of the criterion of brightness-difference has also been revealed by several other and different experimental approaches.

It was previously stated that it is one of the objects of the present invention to provide equipment to diagnose the ability to see and to prescribe not only lenses for correcting ocular defects but other aids to seeing, as light and lighting. Our sensitometer is well adapted for use with any test-object or visual task to determine in a rational manner on the basis of recommended footcandles the effect of a variable degree of illumination as an aid to seeing. This is accomplished by the precise manner in which the degree of illumination on the near-vision unit may be varied and by the use of a photronic cell and the micro-ammeter by which the illumination may be measured in footcandles. Thus with various degrees of illumination on the test-object or visual task the visibility meter will be operated as before and the readings taken. If desired, we may provide on the drum alongside the scale 51 a second scale calibrated in recommended footcandles, but we do not regard this as necessary as the same can be readily plotted as in the graph shown in Fig. 15, wherein the curve 95 shows the relative visibility corresponding to various levels of illumination between 1 and 100 footcandles. The data here graphically shown represent the visibility of 8-point Bodoni book type as viewed by a subject possessing normal vision, but the same relative effects from higher levels of illumination may be expected in cases involving subnormal vision.

Thus it will be seen that the objects of the present invention are attained in a very effective manner. An important point to be noted is that we provide apparatus with which is used a subjective method which yields precise, rational, quantitative and recordable measurements. Further, it is to be noted that the method involves a series of measurements under identical controllable physical conditions, each of which contributes to the final ophthalmic prescription in a quantitative manner. From such a series of measurements the refractionist can compute the statistical reliability of the average value obtained. Still further, the determination of the lens power corresponding to maximum visual efficiency is derived from a charted relationship between visual efficiency and dioptric power, and hence possible errors in individual measurements would have little effect upon the apex of the inverted V-shaped curves obtained. These measurements may be made by a non-professional operator, thus permitting the refractionist more time for analyzing and diagnosing, and errors due to vagaries of the refractionist are excluded. Furthermore, the relationships between the various visual factors which are determinable from sensitometric data are presentable and in fact presented in graphic form which provides among other things a clear explanation to the patient of his refractive condition.

The method used with our sensitometer and for convenience referred to as the sensitometric method introduces a precise and convenient means for investigating retinal as well as refractive phenomena, and since visual function is influenced by many biologic factors, the precise data obtainable with our sensitometric method offer a quantitative basis for appraising such conditions as night blindness, for example. In other words, it might be stated that the sensitometric method determines in terms of precise rational quantitative recordable measurements of the visibility of a suitable test-object not only the refractive errors of the eye or eyes and deficiencies of retinal sensibility, but the effects of other conditions which affect visibility, such as fatigue, eccentricities of the eye muscles, etc.

We wish to point out also that while the sensitometric method of attaining spherical corrections is in a measure similar to that known as the stenopaic slit method, there are important differences between the latter and the sensitometric method in the respects that the double-concave bar test-object is substituted for the slit, the test-object is an exceedingly small fraction of the size of the smallest practical stenopaic slit, and the sensitometric method does not obscure any part of the pupil. A further advantage resides in the fact that our preferred test-object eliminates the need for the use of drugs which paralyze the muscles of accommodation due to the fact that by making the measurements at the threshold of brightness-difference there is the minimum, if any, tendency for accommodative effort to obscure refractive errors.

We also wish to point out that the sensitometric method, due to inherent precision, is particularly well adapted for tracing the progressive changes in visual function resulting from orthoptic exercises and has been so used. An explanation of this phase of the sensitometric method follows.

At intervals during the period of treatment, a series of visibility measurements is made by the patient in accordance with the previously described technique. The mean or average of these data is taken as a measure of the visual efficiency of the patient at the time of measurement. If, at a later date, a similar series of measurements is made, the difference between the average values of visibility denotes a change in the visual efficiency of the patient provided that the observed difference is real and not a result of chance. The sensitometric method of diagnosing the progress of orthoptic cases, such as amblyopia or pseudo-myopia, is unique and valuable since any observed change in visual efficiency may be appraised for reliability by statistical methods of analysis. Such an analysis is made possible by the fact that a large number of rational and quantitative measurements of the visibility of a given test-object may be made by the sensitometric method. Obviously, the accumulation of a relatively large number of observations, made under identical physical conditions, is essential in order to reveal small changes in visual efficiency since a single visual observation possesses little reliability as a diagnostic datum. In the sensitometric method, repeated measurements of the visibility of a given test-object are possible by reason of the fact that the patient is unable to remember and be guided by previously presented photometric stimuli. This is not the case when visual efficiency is appraised by means of test charts, such as the Snellen chart.

Finally, it might be stated that the sensitometric method includes the control and measurement of light on the test-object and yields measurements of the effect of light on visibility. This makes it possible to prescribe light as an aid to seeing on a rational basis, and after visibility has been increased to the maximum possible by means of lenses, more light can still further increase visibility, and the increase in visibility due to the increase in the amount of light can be accurately measured. Likewise, the method includes the introduction and demonstration of the effects of improper lighting in decreasing visibility. Furthermore, the effect of a definite glare-source of a definite brightness in reducing visibility offers a rational method for prescribing absorbing lenses. A glaring light source, extreme brightness contrast, and specular reflection are easily demonstrated and the effects upon visibility may be precisely measured. The visibility of type size, printing, traffic aids, signs, signals, beams, and a variety of countless visual tasks upon which efficiency, safety, comfort, life, and the health of human beings depend may be appraised by substituting such tasks for the standard concave bar test-object. Thus the sensitometric method permits the appraisal of the visibility of three-dimension objects as well as those lying in a single plane.

While we have shown the preferred form of appartus which has proved very efficient, we do not desire to be confined to the precise details of the equipment illustrated herein, but aim in our claims to cover all modifications which do not involve a departure from the spirit and scope of the invention in its broadeast aspects.

Having thus described our invention, we claim:

1. Apparatus for testing visual efficiency comprising a visual field consisting of a test object and a support on which it is mounted having a surface surrounding the test object constituting a background therefor, the test object having a brightness contrasting with the surrounding surface of said support, means for illuminating said visual field, means forming a pupillary aperture through which said field including the test object is viewed, means adjacent to and in front of said aperture for varying the intensity of the light passing through said aperture from said visual field and for simultaneously varying the contrast between said test object and the surrounding surface of its support as viewed through said aperture, said means comprising a gradient filter the absorption and diffusion characteristics of which gradually and uniformly increase from a relatively clear portion to a very dense and diffusing portion, means for moving said gradient past the aperture, and a scale from which visibility measurements of a rational quantitative type may be taken, said scale being associated with the gradient and being calibrated in terms of one of the fundamental variables of the visual threshold.

2. Apparatus for testing visual efficiency comprising a visual field consisting of a test object and a support on which it is mounted having a surface surrounding the test object constituting a background therefor, the test object having a brightness contrasting with the surrounding surface of said support, means for illuminating said visual field, means forming a pair of pupillary apertures through which said visual field is viewed, means adjacent to and in front of said apertures for varying the intensity of the light passing through said apertures from said visual field and for simultaneously varying the contrast between said object and the surrounding surface of its support as viewed through said apertures, said means comprising a pair of gradient filters the absorption and diffusion characteristics of which gradually and uniformly increase from a relatively clear portion to a very dense and diffusing portion, means for simultaneously moving said gradients past the apertures, and a scale from which visibility measurements of a rational quantitative type may be taken, said scale being operatively connected with the gradients and being calibrated in terms of one of the fundamental variables of the visual threshold.

MATTHEW LUCKIESH.
FRANK K. MOSS.